United States Patent [19]

Howland et al.

[11] Patent Number: 5,065,587
[45] Date of Patent: Nov. 19, 1991

[54] COMPARTMENTALIZED TRANSPORT REFRIGERATION SYSTEM

[75] Inventors: Leland L. Howland, Belle Plaine; Jan M. Parker, Minneapolis; Doyle G. Herrig, Elko, all of Minn.; David A. Swanson, Carol Stream, Ill.

[73] Assignee: Thermo King Corporation, Minneapolis, Minn.

[21] Appl. No.: 646,980

[22] Filed: Jan. 28, 1991

[51] Int. Cl.$^5$ .............................................. F25D 29/00
[52] U.S. Cl. ........................................ 62/131; 62/200; 62/239; 62/267; 236/1 R; 200/61.62
[58] Field of Search ................. 62/131, 161, 162, 163, 62/126, 153, 199, 200, 223, 239, 265, 267, 441, 442; 236/1 R; 200/61.62

[56] References Cited

U.S. PATENT DOCUMENTS

| | | | |
|---|---|---|---|
| 3,729,735 | 4/1973 | Dageford | 236/1 R |
| 4,035,796 | 7/1977 | Hedly et al. | 236/1 R |
| 4,060,400 | 11/1977 | Williams | 62/162 |
| 4,338,511 | 7/1982 | Six | 236/1 R |
| 4,419,866 | 12/1983 | Howland | 62/228.4 |
| 4,685,306 | 8/1987 | Howland et al. | 62/117 |
| 4,706,468 | 11/1987 | Howland et al. | 62/199 |
| 4,711,095 | 12/1987 | Howland et al. | 62/117 |
| 4,712,383 | 12/1987 | Howland et al. | 62/200 |
| 4,896,512 | 1/1990 | Howland | 62/117 |
| 4,932,219 | 6/1990 | Howland et al. | 62/174 |

FOREIGN PATENT DOCUMENTS 988874 4/1965 United Kingdom .

Primary Examiner—Harry B. Tanner
Attorney, Agent, or Firm—D. R. Lacker

[57] ABSTRACT

A compartmentalized transport refrigeration system having refrigeration control, and interconnected host and remote refrigeration units for respectively conditioning the air in front and rear compartments of a trailer. The trailer has front and rear doors for access to the front and rear compartments, respectively, and a door switch connected to the refrigeration control which modifies the operation of the refrigeration system when the front access door is opened. When the front access door is opened, the host refrigeration unit is operated in null and the remote refrigeration unit is cycled between heating and cooling modes. A door switch may also be provided for the second access door which modifies the operation of the transport refrigeration system by effectively turning the remote refrigeration unit off.

6 Claims, 4 Drawing Sheets

COMPARTMENTALIZED TRANSPORT REFRIGERATION SYSTEM

TECHNICAL FIELD

The invention relates in general to refrigeration systems, and more specifically to a transport refrigeration system having host and remote refrigeration units for compartmentalized trailers.

BACKGROUND ART

Trailers are often compartmentalized to provide two or more separate compartments, the air to each being conditioned according to the type of load or cargo to be placed in the compartment. The most common compartmentalized arrangement of a trailer provides two compartments, a front compartment which usually carries a frozen load, and a rear compartment which usually carries a fresh load. A refrigeration unit mounted on the outer front wall of the trailer, called the host refrigeration unit, has an evaporator which serves the front compartment, and the host refrigeration unit also provides refrigerant for a remote refrigeration unit mounted in the rear compartment.

When the front compartment is loaded or unloaded via a suitable front access door, it is common practice to manually shut the host refrigeration unit down. Thus, neither compartment is conditioned while the front compartment is being loaded or unloaded, and the host refrigeration unit must then try to bring both compartments back to the desired set point temperature before the tractor-trailer reaches the next loading or unloading point. If the host unit is allowed to operate, instead of shutting it down, it is wasteful of fuel and it is uncomfortable for the personnel trying to load or unload the front compartment.

When the rear compartment is loaded or unloaded via a rear access door it is common to manually shut the rear refrigeration unit down. If the rear refrigeration unit is not shut down, it wastes fuel.

It would be desirable, and it is an object of the present invention, to be able to automatically operate a compartmentalized trailer for optimum efficiency and enhanced operation, while eliminating any dependency upon timely manual selection of operating modes.

SUMMARY OF THE INVENTION

Briefly, the present invention is a new compartmentalized transport refrigeration system having front and rear compartments, first and second access doors to the front and rear compartments, respectively, a host refrigeration unit, and a remote refrigeration unit. First and second thermostats, controlled by the host and remote refrigeration units, respectively, control the temperatures of the front and rear compartments to first and second selected set point temperatures.

The host refrigeration unit includes a compressor driven by a prime mover in a selected one of high and low speeds, a condenser, a receiver, a local or host evaporator for the front compartment, hot gas, liquid and suction lines, and a host evaporator damper. The remote refrigeration unit includes a remote evaporator for the rear compartment, with the remote evaporator system being connected to the host refrigeration unit via remote hot gas, liquid and suction lines. Electrical control, which controls the operation of the host and remote refrigeration systems, includes a door switch mounted to be responsive to the position of the first or front door. The door switch, when the first door is open, automatically causes the electrical control to modify the operation of the transport refrigeration system by operating the host refrigeration unit in null (i.e., neither heating or cooling), and by cycling the remote refrigeration unit between heating and cooling modes to maintain a selected set point temperature in the rear compartment. Thus, the rear compartment is held close to set point temperature while the front door is open, and the host refrigeration unit need only make up for the losses associated with the front compartment, instead of both compartments, substantially enhancing the operation and efficiency of the overall system.

In another embodiment of the invention, a second door switch is mounted to be responsive to the position of the second or rear door. The electrical control is responsive to the position of the second door switch, disabling the second thermostat and preventing the remote hot gas and remote liquid lines from opening while the rear door is open.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
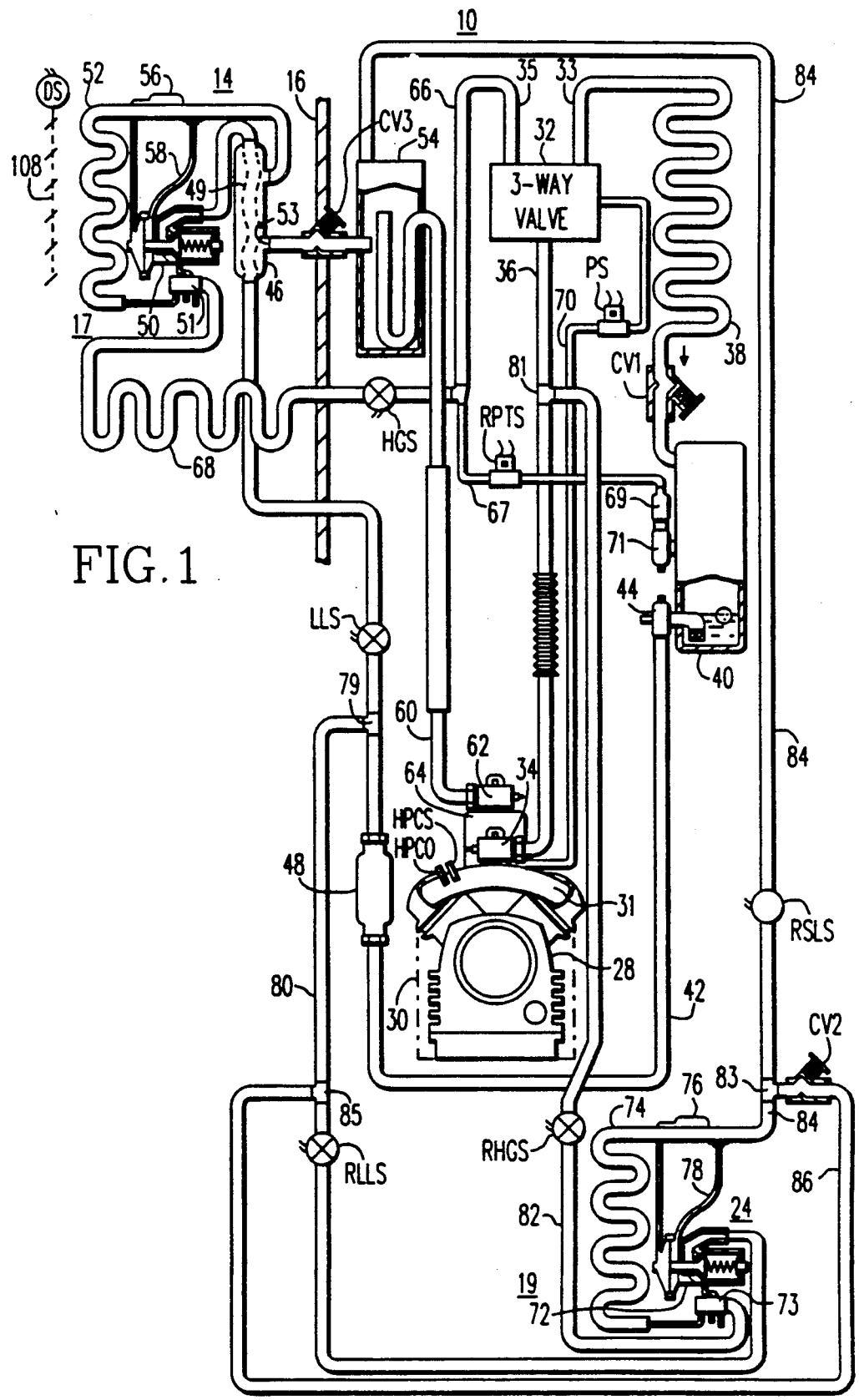
FIG. 1 is a schematic piping diagram of a transport refrigeration system which may be controlled according to the teachings of the invention.

U.S. Pat. Nos. 4,685,306; 4,706,468; 4,711,095; 4,712,383; 4,896,512 and 4,932,219, which are assigned to the same assignee as the present application, disclose compartmentalized transport refrigeration systems which may be improved by the teachings of the invention. U.S. Pat. No. 4,932,219 is hereby incorporated into the specification of the present application by reference. Components in the present application which may be the same as in the incorporated application will be referred to with the same reference numerals.

Figure 2:
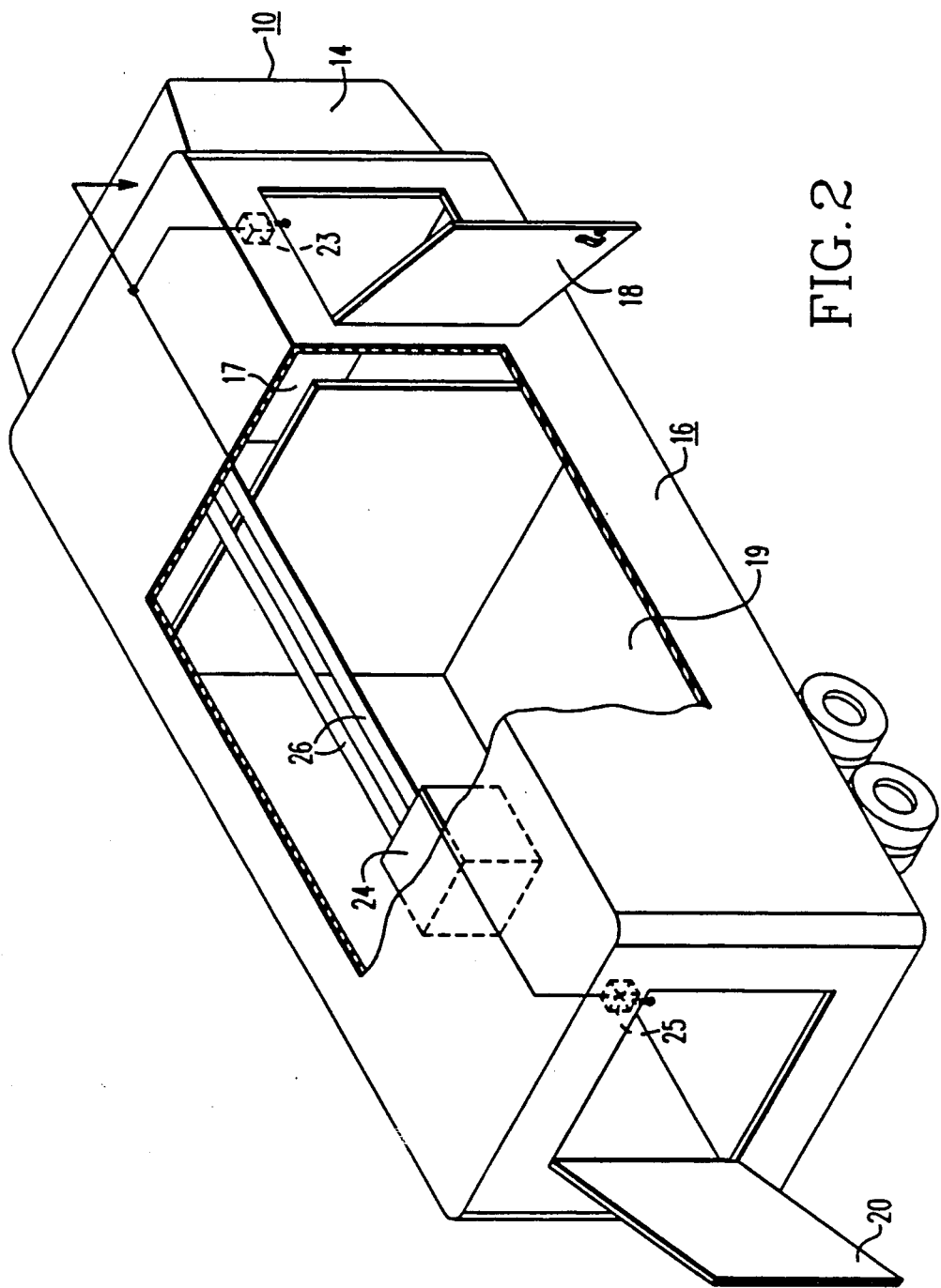
FIG. 2 is a perspective view, shown partially cut away, of a compartmentalized trailer having a transport refrigeration system which may be controlled according to the teachings of the invention.

Referring now to the drawings, there is shown in FIG. 1 a schematic piping diagram of a transport refrigeration system 10. System 10 is associated with a trailer 16, shown in FIG. 2, having front and rear compartments 17 and 19, respectively, to be conditioned. The front and rear compartments 17 and 19 have access doors 18 and 20, respectively. According to the teachings of the invention, a door switch 23 is mounted such that it closes or completes an electrical circuit when front door 18 is not closed. As illustrated, a door switch 25 may also be mounted such that it closes when rear door 20 is not closed. As will be hereinafter described relative to controller 12 shown in FIG. 3, when front door switch 23 closes it modifies the operation of the transport refrigeration system 10, such as by energizing one or more relays, such as relays XK1, XK2, XK3 and XK4 illustrated. The number of relays will depend upon the number of contacts on the relays selected. If a rear door switch 25 is utilized, it may also be used to modify the operation of the transport refrigeration system when it closes, such as by energizing relays XK5 and XK6 shown in FIG. 3.

Figure 3:
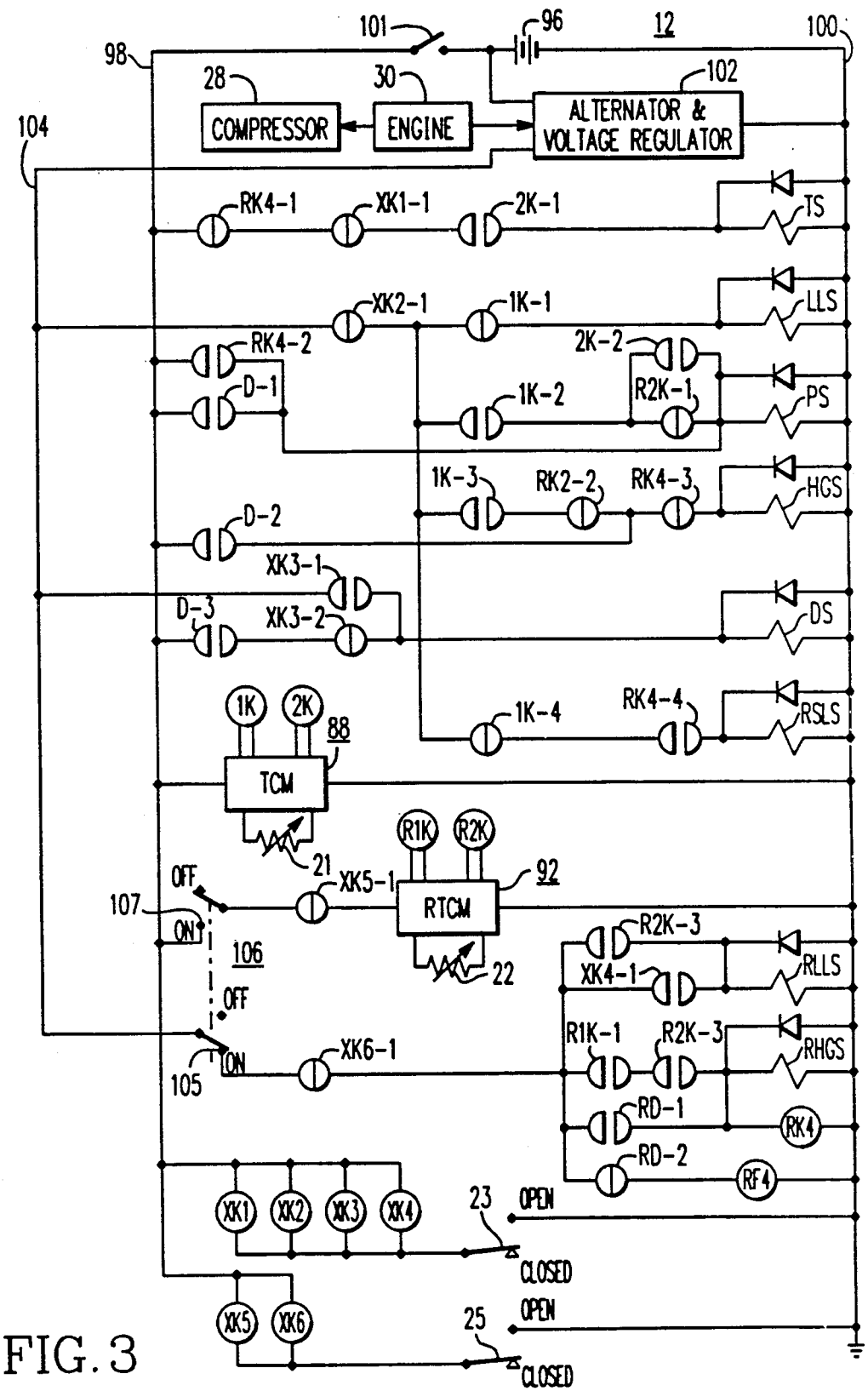
FIG. 3 is an electrical schematic diagram illustrating electrical control which will operate the transport refrigeration system shown in FIGS. 1 and 2 according to the invention.

System 10 is under the control of temperature controller 12 shown in FIG. 3, with controller 12 having temperature sensors 21 and 22 respectively disposed in compartments 17 and 19. Transport refrigeration system 10 includes a host refrigeration unit 14 which is controlled in response to temperature sensor 21, a remote refrigeration unit 24, also called evaporator unit 24, which is controlled in response to temperature sensor 22, and refrigerant piping 26 which interconnects the two refrigeration units. FIG. 3 also illustrates a plurality of controllable solenoid valves having open and closed positions, and check valves. While the solenoid valves will be referred to as having a specified normal de-energized position, it will be understood that the opposite de-energized position may be used by merely modifying the associated control accordingly.

The host refrigeration unit 14 includes closed fluid circuits which include a refrigerant compressor 28 driven by a prime mover such as an internal combustion engine, indicated generally by broken outline 30. A discharge manifold 31 of compressor 28 is connected to a refrigeration circuit selecting valve means 32 via a discharge service valve 34 and a hot gas line 36. Valve means 32 may be a three-way valve, as illustrated, or two separate valves, as desired. For the purposes of this description, valve means 32 will be described as a three-way valve, as illustrated.

Three-way valve 32 is controlled by a pilot solenoid valve PS. When pilot solenoid valve PS is de-energized, three-way valve 32 is biased to a position which directs hot gas from compressor 28 into a first refrigerant circuit 33. When pilot solenoid valve PS is energized, compressor pressure via a conduit 70 operates three-way valve 32 to a position which directs hot gas from compressor 28 into a second refrigerant circuit 35. The first refrigerant circuit 33 directs refrigerant in a closed loop which includes a condenser 38, a check valve CV1, a receiver 40, a liquid line 42, a drier 48, a normally closed, liquid line solenoid valve LLS, a first path 49 through a heat exchanger 46, a refrigerant expansion valve 50, a refrigerant distributor 51, an evaporator 52, a second path 53 through heat exchanger 46, a check valve CV3, an accumulator 54, and a suction line 60 which is connected to the suction port of compressor 28 via a suction line service valve 62 and a suction throttling valve 64.

The accumulator 54 is not essential in all applications. The use of accumulator 54 assures vaporized refrigerant for compressor 28 in systems and/or ambients where slugging may be a problem.

The first refrigerant circuit 33 is the normal cooling circuit for the host refrigeration unit 14, removing heat from a trailer compartment 17 associated with host evaporator 52 and temperature sensor 21, and rejecting heat in condenser 38 to ambient.

When host evaporator 52 requires heat for defrosting, or for holding a selected set point temperature, as detected by sensor 21, controller 12 energizes pilot solenoid valve PS. Pressure from compressor 28 now operates three-way valve 32 which directs hot compressor gas to the second refrigerant circuit 35. The second refrigerant circuit 35 includes hot gas line 66, a normally closed hot gas solenoid valve HGS, a defrost pan heater 68, distributor 51, evaporator 52, the second path 53 through heat exchanger 46, check valve CV3, accumulator 54, and back to compressor 28 via suction line 60.

A receiver pressurizing tap 67 extends from hot gas line 66 to receiver 40 via a solenoid valve RPTS, a check valve 69, and a service valve 71.

The remote evaporator unit 24 includes a refrigerant expansion valve 72, a refrigerant distributor 73, and an evaporator 74. Expansion valve 72 is connected to liquid line 42, between drier 48 and liquid line solenoid valve LLS, via a tee 79, and a remote liquid line 80 which includes a normally closed remote liquid line solenoid valve RLLS. Distributor 73 is connected to hot gas line 36 via a tee 81, and a remote hot gas line 82 which includes a normally closed remote hot gas line solenoid valve RHGS. The outlet of remote evaporator 74 is connected to a tee 83 via a remote suction line 84. One outlet of tee 83 is connected to a tee 85 located in remote liquid line 80, between remote liquid line valve RLLS and tee 79, via a conduit 86 which includes a check valve CV2. While this outlet of tee 83 could be connected to the input side of receiver 40, there are definite advantages to connecting line 86 to remote liquid line 80. For example, line 86 does not have to be run all the way back to the receiver 40 which is located in the host unit 14, which facilitates adding the invention to a transport refrigeration unit in the field. Further, returning refrigerant to the remote liquid line 80 gets the refrigerant back into an active refrigeration circuit faster than returning it to the receiver 40.

The remaining outlet of tee 83 is connected to the accumulator 54 via a continuation of remote suction line 84 which includes a normally open remote suction line solenoid valve RSLS.

High pressure cut out switches HPCO and HPCS are located to monitor compressor head pressure, such as on the discharge manifold 31.

FIG. 3 is an electrical schematic diagram of controller 12 illustrating some of the electrical components of host unit 14 and the remote unit 24 which are important to the explanation of the present invention.

An electrical supply system, indicated generally by a battery 96, energizes a pair of conductors 98 and 100 via an on-off switch 101.

Figure 4:
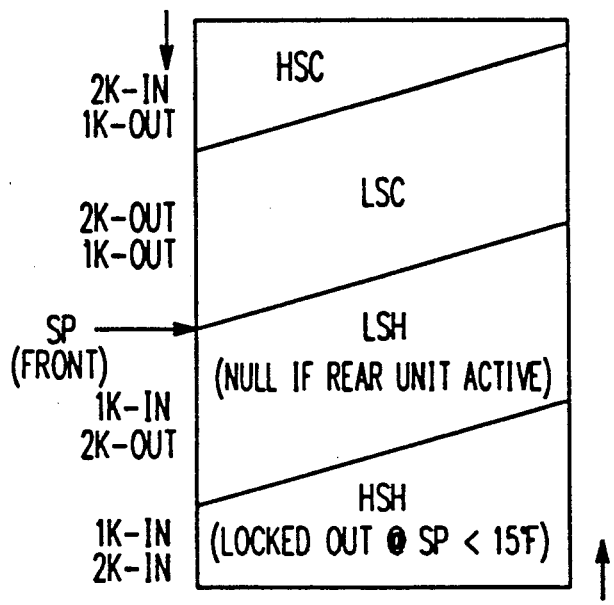
FIG. 4 is a diagram which illustrates the normal heating, cooling and null modes of the front compartment of the trailer shown in FIG. 2, controlled by a host refrigeration unit of the transport refrigeration system.

The host refrigeration unit 14 includes a thermostat 88 connected between conductors 90 and 100, with thermostat 88 having a temperature control module TCM, the hereinbefore mentioned temperature sensor 21, which is disposed in the front compartment 17, a heat relay 1K, and a speed relay 2K. A control algorithm shown in FIG. 4 illustrates typical sequences for operating relays 1K and 2K during both falling and rising temperatures relative to a selected set point temperature.

When the speed relay 2K is energized, the prime mover 30 is operated in a predetermined high speed position, such as 2200 RPM. When speed relay 2K is de-energized the prime mover 30 is operated in a predetermined low speed position, such as 1400 RPM.

When the heat relay 1K is de-energized, a cooling cycle or mode is selected, and when the heat relay 1KH is energized, a heat cycle or mode is selected.

Figure 5:
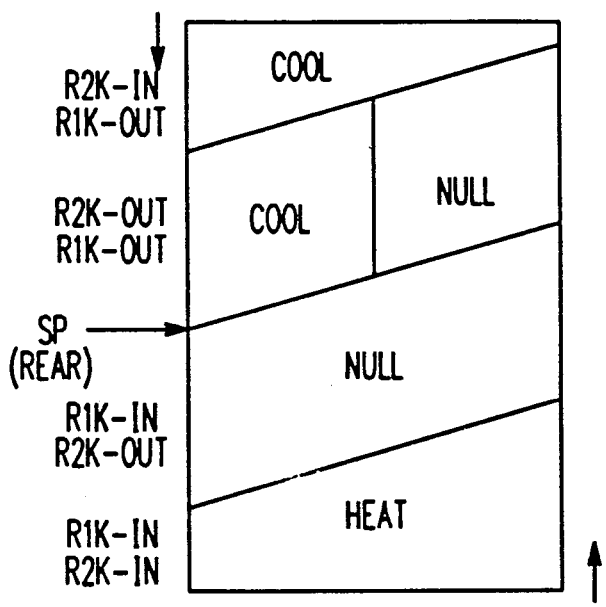
FIG. 5 is a diagram similar to that of FIG. 4, except illustrating the normal heating, cooling, and null modes of the rear compartment of the trailer shown in FIG. 2, controlled by a remote refrigeration unit which receives refrigerant from the host refrigeration unit.

The remote unit 24 includes a thermostat 92 having a temperature control module RTCM, the hereinbefore mentioned temperature sensor 22, which is disposed in the rear compartment 19, a heat relay R1K and a speed relay R2K. Relays R1K and R2K operate as illustrated in a control algorithm shown in FIG. 5. When R2K is in and R1K is out, the rear refrigeration unit 24 will be in a cool mode. The rear unit 24 will be in high-speed cool if the front unit requires high speed. When both relays R1K and R2K are out or de-energized, the remote unit 24 will be in a cool mode during falling temperature, and in null during rising temperature. When relay R1K is in and relay R2K is out, the remote unit 24 will be in null. When both relays R1K and R2K are in, the remote unit will be in a heating cycle.

The temperature controller 12 includes an alternator and voltage regulator 102, with the prime mover or engine 30 driving the alternator. When engine 30 is running, the alternator and voltage regulator provide a regulated DC voltage between a conductor 104 and grounded conductor 100. Temperature controller 12 additionally includes a throttle solenoid TS connected to a throttle linkage associated with engine 30, a liquid line solenoid LLS for operating valve LLS shown in FIG. 1, a pilot solenoid PS for operating valve PS, a hot gas solenoid HGS for operating valve HGS, and a damper solenoid DS for operating a damper 108, all associated with operation of the host unit 14. Damper 108 closes when damper solenoid DS is energized, to close the air path from the host evaporator 52 to the first compartment 17. Temperature controller 12 further includes a remote suction line solenoid RSLS for valve RSLS, a remote liquid line solenoid RLLS for valve RLLS, a remote hot gas solenoid RHGS for valve RHGS, a hot gas lock out relay RK4 and a rear evaporator fan relay RFR, all associated with the remote refrigeration unit 24.

According to the teachings of the invention, the first or front door switch 23 controls a plurality of relay contacts, which may be provided by one or more relays. For purposes of example, four relays XK1, XK2, XK3, and XK4 are provided. Relays XK1, XK2, XK3 and XK4 are each connected between conductors 98 and 100 via front door switch 23.

Relay XK1 has a normally closed contact XK1-1 which is connected in a series circuit between conductors 98 and 100 which includes a throttle solenoid TS, a normally closed contact RK4-1 of the hot gas lock out relay RK4, and a normally open contact 2K-1 of the speed relay 2K. The throttle solenoid TS operates a throttle on engine 30, causing engine 30 to run at a predetermined low speed, such as 1400 RPM, when TS is de-energized, and causing engine 30 to run at a predetermined higher speed, such as 2200 RPM when energized. Thus, when the front door 18 is open, the throttle solenoid TS cannot be energized by contact 2K-1 of the speed relay 2K, and the host refrigeration unit 14 will be forced to operate in low speed.

Relay XK2 has a normally closed contact XK2-1 which connects a plurality of circuits between conductors 104 and 100. The first of such circuits includes liquid line solenoid, LLS, which is normally closed, and a normally closed contact 1K-1 of the heat relay 1K.

Thus, when the front door 18 is open, the liquid line solenoid LLS cannot be energized to open the associated valve LLS and allow refrigerant to flow to the front evaporator 52, even though heat relay 1K may be de-energized, calling for a cooling mode in the first or front compartment 17.

The second of the circuits controlled by normally closed contact XK2-1 includes solenoid PS for operating the normally closed pilot solenoid valve PS, a normally open contact 1K-2 of the heat relay 1K, and a parallel circuit which includes a normally open contact 2K-2 of the speed relay 2K and a normally closed contact R2K-1 of relay R2K. Pilot solenoid PS controls the position of three-way valve 32, allowing valve 32 to direct refrigerant to condenser 38 via refrigerant circuit 33 when pilot solenoid PS is de-energized, and causing valve 32 to direct refrigerant to refrigerant circuit 35 when pilot solenoid PS is energized. Thus, when the front door 18 is open, pilot solenoid PS cannot be energized by the heat relay 1K calling for a heating mode, allowing refrigerant to be directed to the remote evaporator by virtue of the closed liquid line solenoid valve LLS and an open remote liquid line solenoid valve RLLS, to operate the remote unit 24 in a cooling mode. When the front door 18 is open, the pilot solenoid PS can be energized by a contact RK4-2 of the hot gas lock out relay RK4, which is energized when the rear unit 24 calls for a heating mode, i.e., when the remote hot gas solenoid RHGS is energized. Since as will be hereinafter discussed, the hot gas solenoid valve HGS will be closed while the front door 18 is open, switching three-way valve 32 to circuit 35 by energizing the pilot solenoid PS enables a heating mode to take place in the remote unit 24 by energizing and thus opening the normally closed remote hot gas solenoid valve RHGS. Pilot solenoid PS may also be energized to initiate a defrost operation of evaporator 52 via a normally open contact D-1 of a defrost relay D (not shown).

The third circuit controlled by the normally closed contact XK2-1 of relay XK2 includes the normally closed hot gas relay HGS, a normally open contact 1K-3 of the heat relay 1K, a normally closed contact R2K-2 of relay R2K, and a normally closed contact RK4-3 of the hot gas lock out relay RK4. Thus, when the front door 18 is open, the hot gas solenoid HGS cannot be energized by the heat relay 1K calling for a heating mode in the front compartment 17. If the rear unit 24 is not calling for a heating mode, hot gas solenoid HGS can be energized by a normally open contact D-2 of the hereinbefore mentioned defrost relay D.

The last of the circuits controlled by the normally closed contact XK2-1 of relay XK2 includes solenoid RSLS of the normally open remote suction line solenoid valve RSLS, a normally closed contact 1K-4 of the heat relay 1K, and a normally open contact RK4-4 of the hot gas lock out relay RK4. Thus, when the front door 18 is open, the remote suction line solenoid valve RSLS cannot be closed, forcing refrigerant to return directly to the accumulator 54 from the remote unit 24, instead of directing refrigerant to the host evaporator which may be done when the rear unit is in a heating mode and the front door is not open.

Relay XK3 has two contacts, XK3-1 and XK3-2 associated with the damper solenoid DS. Contact XK3-1, a normally open contact, is in a circuit which connects the damper solenoid DS between conductors 104 and 100. Contact XK3-2, a normally closed contact, is in a circuit which includes a normally open contact D-3 from the defrost relay D and the damper solenoid DS. Thus, when the front door is open and engine 30 is running, contact XK3-1 energizes the damper solenoid DS to close the damper associated with the host evaporator 52. When the engine is not running, such as when the refrigeration system 10 is operated in a mode which shuts engine 30 down when neither the front or rear compartments require heating or cooling, it is desirable to keep damper 108 open. Contact XK3-2 prevents the defrost relay D from closing damper 108 while the front door 18 is open and the engine is not running.

Relay XK4 includes a normally open contact XK4-1 which is connected in a circuit between conductors 104 and 100 which includes a solenoid RLLS of the normally closed remote liquid line solenoid valve RLLS, and a pole 105 of a two pole, double throw switch 106, which also includes a pole 107. Switch 106 is used to manually turn the remote unit 24 off. Contact XK4-1 parallels a normally open contact R2K-3 of relay R2K. When switch 106 is in the "on" position shown in FIG. 3 and the engine 30 is running, the remote liquid line solenoid RLLS will be continuously energized, and thus valve RLLS will be open.

The operation of the transport refrigeration system 10 when operated continuously, as opposed to a start-stop operation, with remote unit selector switch 106 in the "on" position shown, and with the first or front door 18 open, includes running engine 30 at low speed, closing the damper 108 of the host evaporator 52, disabling the liquid line solenoid LLS, making sure that valve LLS remains closed, and energizing the remote liquid line solenoid RLLS continuously, to make sure that valve RLLS remains open. This results in forcing refrigerant to flow only through the remote or rear unit 24. The host unit 14 will be in a "null" type mode, i.e., neither heating or cooling, and the rear unit 24 will cycle between heating and cooling modes to maintain the selected set point.

The operation of the transport refrigeration system 10 when operated in a start-stop mode, instead of in a continuous mode, such as the start-stop mode disclosed in U.S. Pat. No. 4,419,866, which is assigned to the same assignee as the present application, with remote unit selector switch 106 in the "on" position, and with the front door 18 open, results in the four relays XK1, XK2, XK3 and XK4 being energized whether or not engine 30 is running, as they are connected between conductors 98 and 100. If the engine 30 is off when front door 18 is opened, the engine will remain off as long as the rear compartment 19 is satisfied, i.e., in null. The rear thermostat 92 will be the only thermostat that can cause engine 30 to start and run. When the rear thermostat 92 starts engine 30, the host evaporator damper 108 will close and remain closed for as long as engine 30 continues to run. The front liquid line solenoid LLS will be de-energized. If the rear compartment 19 becomes "satisfied" while the front door 18 is open, engine 30 will stop and the host evaporator damper will open.

Instead of depending upon someone to manually turn the remote unit 24 off when the second or rear door 20 is opened, relays XK5 and XK6 may be used to automatically perform that function. Relay XK5 has a normally closed contact XK5-1 connected in a circuit between conductors 98 and 100 which includes thermostat 92 and pole 107 of switch 106. Thus, when rear door 20 is opened, thermostat 92 is immediately disabled.

Relay XK6 has a normally closed contact XK6-1 in series with pole 105 of switch 106. The series circuit which includes pole 105 and contact XK6-1 is connected to a plurality of parallel connected circuits between conductors 104 and 100. A first circuit includes the hereinbefore described circuit which includes the remote liquid line solenoid RLLS and the parallel connected contacts XK4-1 and R2K-3. A second circuit includes the remote hot gas solenoid RHGS, a normally open contact R1K-1 of relay R1K, and a normally open contact R2K-3 of relay R2K. Normally open contact RD-1 of a rear evaporator defrost relay RD (not shown) parallels the serially connected contacts R1K-1 and R2K-3. The hot gas lockout relay RK4 is connected directly across solenoid RHGS, and is thus energized and de-energized at the same time as solenoid RHGS. A third circuit includes the remote fan relay RFR and a normally closed contact RD-2 of the rear evaporator defrost relay RD.

Thus, when relays XK5 and XK6 are connected to rear door switch 25, as shown in FIG. 3, as soon as the rear door 20 is opened, the remote unit 24 is automatically turned off.

We claim:

1. In a compartmentalized transport refrigeration system having front and rear compartments, first and second access doors to the front and rear compartments, respectively, first and second thermostats which respectively control the temperatures in the front and rear compartments to first and second set point temperatures via null, heating and cooling cycles, a host refrigeration unit which includes a compressor driven by a prime mover in a selected one of high and low speeds, a condenser, a receiver, a local evaporator for the front compartment, hot gas, liquid and suction lines, and a host evaporator damper, a remote refrigeration unit including a remote evaporator for the rear compartment, with the remote evaporator unit being connected to the host refrigeration unit via remote hot gas, liquid and suction lines, and electrical control for controlling the operation of the host and remote refrigeration units, the improvement comprising:

a door switch mounted to be responsive to the position of the first door, and control means in the electrical control connected to be responsive to said door switch such that said door switch, when the first door is open, causes said control means to modify the operation of the transport refrigeration system by operating the host refrigeration unit in null and by cycling the remote refrigeration unit between heating and cooling modes to maintain set point in the rear compartment.

2. In the transport refrigeration system of claim 1 wherein the control means includes means for closing the host evaporator damper while the first door is open and the prime mover is driving the compressor.

3. In the transport refrigeration system of claim 1 wherein the control means includes means for causing the prime mover, when operating, to operate the compressor at low speed while the first door is open.

4. In the transport refrigeration system of claim 1 wherein the control means includes means for respectively closing and opening the liquid lines of the host and remote refrigeration systems while the first door is open and the prime mover is operating.

5. In the transport refrigeration system of claim 1 including a second door switch mounted to be responsive to the position of the second door, with the control means including means responsive to the second door switch such that when the second door is open the remote refrigeration unit is effectively turned off.

6. In the transport refrigeration system of claim 5 wherein the control means responsive to the second door switch includes means for preventing the remote hot gas and remote liquid lines from opening, and means for disabling the second thermostat.

* * * * *